(12) United States Patent
Lazaridis et al.

(10) Patent No.: US 7,532,198 B2
(45) Date of Patent: May 12, 2009

(54) HANDHELD ELECTRONIC DEVICE WITH ROLLER BALL INPUT

(75) Inventors: Mihal Lazaridis, Waterloo (CA); Jason T. Griffin, Waterloo (CA); Steven Henry Fyke, Waterloo (CA)

(73) Assignee: Research in Motion Limited, Waterloo, ON (CA)

( * ) Notice: Subject to any disclaimer, the term of this patent is extended or adjusted under 35 U.S.C. 154(b) by 685 days.

(21) Appl. No.: 11/035,793

(22) Filed: Jan. 14, 2005

(65) Prior Publication Data

US 2006/0158428 A1 Jul. 20, 2006

(51) Int. Cl.
*G09G 5/08* (2006.01)

(52) U.S. Cl. ............... 345/157; 345/164; 345/167; 345/168; 345/169

(58) Field of Classification Search .......... 345/156–169
See application file for complete search history.

(56) References Cited

U.S. PATENT DOCUMENTS

| | | | |
|---|---|---|---|
| 6,201,534 B1 * | 3/2001 | Steele et al. ............... 345/157 |
| 6,204,848 B1 | 3/2001 | Nowlan et al. |
| 6,496,181 B1 | 12/2002 | Boemer et al. |
| 7,002,553 B2 * | 2/2006 | Shkolnikov ............... 345/169 |
| 7,345,670 B2 | 3/2008 | Armstrong |
| 2003/0014275 A1 * | 1/2003 | Bearden et al. ............... 705/1 |
| 2004/0263479 A1 * | 12/2004 | Shkolnikov ............... 345/169 |

FOREIGN PATENT DOCUMENTS

| | | |
|---|---|---|
| CN | 1259414 | 5/2001 |
| EP | 1031914 A | 8/2000 |
| EP | 1098498 A | 5/2001 |
| EP | 1378856 | 1/2004 |

* cited by examiner

*Primary Examiner*—Vijay Shankar
(74) *Attorney, Agent, or Firm*—Novak Druce + Quigg LLP

(57) ABSTRACT

An improved handheld electronic device includes an input apparatus, an output apparatus, and a processor apparatus. The input apparatus includes a reduced keyboard and a roller ball input. The roller ball input includes a movable portion that is substantially continuously rotatable with respect to a housing of the device and is rotatable about more than one axis to provide input. The processor apparatus includes a disambiguation routine that can output various proposed interpretations of inputs from the reduced keyboard. The roller ball input advantageously provides various inputs to the handheld electronic device without requiring significant user attention, which enables a user to direct a greater amount of attention to the output from the disambiguation routine and to other aspects of the device. The roller ball input potentially can be configured to additionally be translatable to provide an input, and additionally and/or alternatively the roller ball input can provide a tactile or other feedback to a user.

14 Claims, 3 Drawing Sheets

HANDHELD ELECTRONIC DEVICE WITH ROLLER BALL INPUT

BACKGROUND OF THE INVENTION

1. Field of the Invention

The invention relates generally to handheld electronic devices and, more particularly, to a handheld electronic device having a roller ball input.

2. Background of the Invention

Numerous types of handheld electronic devices are known. Examples of such handheld electronic devices include, for instance, personal data assistants (PDAs), handheld computers, two-way pagers, cellular telephones, and the like. Such handheld electronic devices are generally intended to be portable, and thus are relatively small. Many handheld electronic devices also features wireless communication capability, although many such handheld electronic devices are stand-alone devices that are functional without communication with other devices. With advances in technology, handheld electronic devices are being configured to include greater numbers of features while having relatively smaller form factors.

A user can interact or interface with a handheld electronic device in many fashions such as, for example, by actuating keys to provide inputs and by viewing outputs visually depicted on a display, as well as in numerous other fashions. It is desirable to configure a handheld electronic device to enable a user to provide inputs with minimal effort, because features that are complicated to use will simply be ignored by a user and left unused. Because of the generally competing considerations of reducing size of a handheld electronic device while increasing the complexity and versatility of the device, the various input devices on recent handheld electronic devices have often either been made relatively small or made to have multiple functions associated therewith, or both, and this can have the undesirable effect of complicating user inputs.

Efforts have been made to reduce the size of handheld electronic devices while maintaining or increasing their versatility by providing relatively fewer input members such as keys and by assigning multiple linguistic elements such as letters, strokes, ideograms, and the like, as well as digits, to at least some of the keys. Such a keyboard has been referred to as a reduced keyboard. Such handheld electronic devices will typically include a user interface having a routine that interprets the inputs from such input members. For instance, the user interface may provide for multitap input wherein a user actuates a key a number of times corresponding with the position of the desired linguistic element on a key. Another type of input routine is a disambiguation routine that performs a disambiguation function. That is, in response to an actuation of a key having multiple linguistic elements assigned thereto, the disambiguation routine outputs a linguistic element that is assumed to have been intended by the user based on various prediction models. Such a disambiguation routine typically will also output alternative linguistic elements or other types of alternative outputs intended to facilitate user input. Disambiguation systems have not, however, been without limitation.

As a user actuates keys to enter a word on a reduced keyboard, the quantity of possible letter permutations that could correspond with the series of keystrokes increases progressively and dramatically. A number of the letter permutations typically will be output to the user as variant proposed inputs. Numerous prediction models and other models and methodologies are employed to limit the quantity of variants that are displayed to the user in order to provide generally only those variants that a user would wish to view for purposes of possible selection by the user. The quantity of variants can, however, be quite large, and a user may need to pay significant attention to the displayed variants during text entry. Since handheld electronic devices having reduced keyboards are preferred to be easy to use, it would be desirable to configure a handheld electronic device having a reduced keyboard and a disambiguation routine in a fashion that reduces the amount of attention required of a user during text entry and during other use.

With increased complexity of applications available on handheld electronic devices, inputs from a user can similarly be required to be complex. Inputs that are provided by, for instance, buttons and joysticks, typically require multiple actuations to obtain multiple inputs, and such multiple actuations undesirably generally each require user attention. It is thus desirable to provide an improved input apparatus that provides greater versatility and that facilitates input into a handheld electronic device.

SUMMARY OF THE INVENTION

An improved handheld electronic device includes an input apparatus, an output apparatus, and a processor apparatus. The input apparatus includes a reduced keyboard and a roller ball input. The roller ball input includes a movable portion that is substantially continuously rotatable with respect to a housing of the device and is rotatable about more than one axis to provide input. The processor apparatus includes a disambiguation routine that can output various proposed interpretations of inputs from the reduced keyboard. The roller ball input advantageously provides various inputs to the handheld electronic device without requiring significant user attention, which enables a user to direct a greater amount of attention to the output from the disambiguation routine and to other aspects of the device. The roller ball input potentially can be configured to additionally be translatable to provide an input, and additionally and/or alternatively the roller ball input can provide a tactile feedback to a user.

Accordingly, as aspect of the invention is to provide an improved handheld electronic device that includes a roller ball input, a reduced keyboard, and a disambiguation routine.

Another aspect of the invention is to provide an improved handheld electronic device having a reduced keyboard and a disambiguation routine, and that further includes a roller ball input that can provide input to the disambiguation routine without such input activity requiring significant user attention in order to enable the user to pay more attention to output from the disambiguation routine, as well as output from other possible routines.

Another aspect of the invention is to provide an improved handheld electronic device having an input that is continuously rotatable about at least a first axis and a second axis to provide input.

Another aspect of the invention is to provide an improved handheld electronic device having an input member that is capable of numerous types of input.

Another aspect of the invention is to provide an improved handheld electronic device having an input member that is capable of providing a plurality of inputs with a single motion by a user.

Another aspect of the invention is to provide an improved handheld electronic device having an input member that facilitates interaction between a user and the device.

Another aspect of the invention is to provide an improved handheld electronic device having a reduced keyboard and a roller ball input that can be used together in interfacing with a disambiguation routine.

Another aspect of the invention is to provide an improved handheld electronic device having a housing that includes a first portion and a second portion movably connected together, with the handheld electronic device including a roller ball input, a reduced keyboard, and a disambiguation routine.

Accordingly, an aspect of the invention is to provide an improved handheld electronic device, the general nature of which can be stated as including a processor apparatus comprising a processor and a memory, an input apparatus cooperable with the processor apparatus, an output apparatus cooperable with the processor apparatus, the output apparatus including a display, and a housing. The processor apparatus is adapted to receive input from the input apparatus and to provide output to the display. The input apparatus includes a plurality of first input members and a second input member, with each first input member of at least a portion of the plurality of first input members having a plurality of linguistic elements assigned thereto, and with substantially each first input member of the at least a portion of the plurality of first input members being adapted to generate a first input upon being actuated. The second input member includes a movable portion that is substantially continuously rotatable with respect to the housing about at least first axis and a second axis to provide input and, responsive to a rotation of the movable portion about at least one of the first axis and the second axis, the second input member is adapted to generate a number of second inputs, with the rotation including a number of incremental rotations of the movable member a predetermined rotational distance, and with substantially each incremental rotation corresponding with a second input of the number of second inputs. The memory has stored therein a routine that is executable on the processor. Responsive to a detection of a number of first inputs, the routine is adapted to output to the display a number of proposed linguistic elements and, responsive to a detection of a number of second inputs, the routine is adapted to provide another output to the display.

Another aspect of the invention is to provide an improved method of enabling input into a handheld electronic device, with the handheld electronic device including a housing, a processor apparatus, an input apparatus, and an output apparatus. The input apparatus includes a plurality of first input members and a second input member, with each first input member of at least a portion of the plurality of first input members having a plurality of linguistic elements assigned thereto. The second input member is substantially continuously rotatable with respect to the housing about a first axis and a second axis to provide input. The processor apparatus includes a processor and a memory, with the memory including a routine stored therein. The general nature of the method can be stated as including detecting as inputs a number of actuations of a number of first input members of the plurality of first input members and, responsive to said detecting as inputs to the routine a number of actuations of a number of first input members, outputting from the routine to the display an output including a number of proposed linguistic inputs. The method further includes detecting a plurality of first inputs from a first rotation of the second input member about the first axis, the first rotation comprising a plurality of incremental rotations of the second input member a predetermined rotational distance about the first axis, substantially each incremental rotation of the plurality of incremental rotations corresponding with a first input of the plurality of first inputs and, responsive to said detecting a plurality of first inputs, outputting from the routine to the display another output.

Another aspect of the invention is to provide an improved method of enabling input into a handheld electronic device, with the handheld electronic device including a housing, a processor apparatus, an input apparatus, and an output apparatus. The input apparatus includes a plurality of first input members and a second input member, with each first input member of at least a portion of the plurality of first input members having a plurality of linguistic elements assigned thereto, and with the second input member being substantially continuously rotatable with respect to the housing about a first axis and a second axis to provide input. The processor apparatus includes a processor and a memory, with the memory including a routine stored therein. The general nature of the method can be stated as including detecting a number of first inputs to the routine from a number of actuations of a number of first input members of the plurality of first input members, detecting a plurality of second inputs to the routine from a rotation of the second input member, the rotation comprising a plurality of incremental rotations of the second input member a predetermined rotational distance, substantially each incremental rotation of the plurality of incremental rotations corresponding with a second input of the plurality of second inputs, responsive to said detecting a number of first inputs, outputting to the display an output including a number of proposed linguistic inputs and, responsive to said detecting a plurality of second inputs, providing another output to the display.

BRIEF DESCRIPTION OF THE DRAWINGS

A full understanding of the invention can be gained from the following Description of the Preferred Embodiments when read in conjunction with the accompanying drawings in which.

Similar numerals refer to similar parts throughout the specification.

DESCRIPTION OF THE PREFERRED EMBODIMENTS

Figure 1:
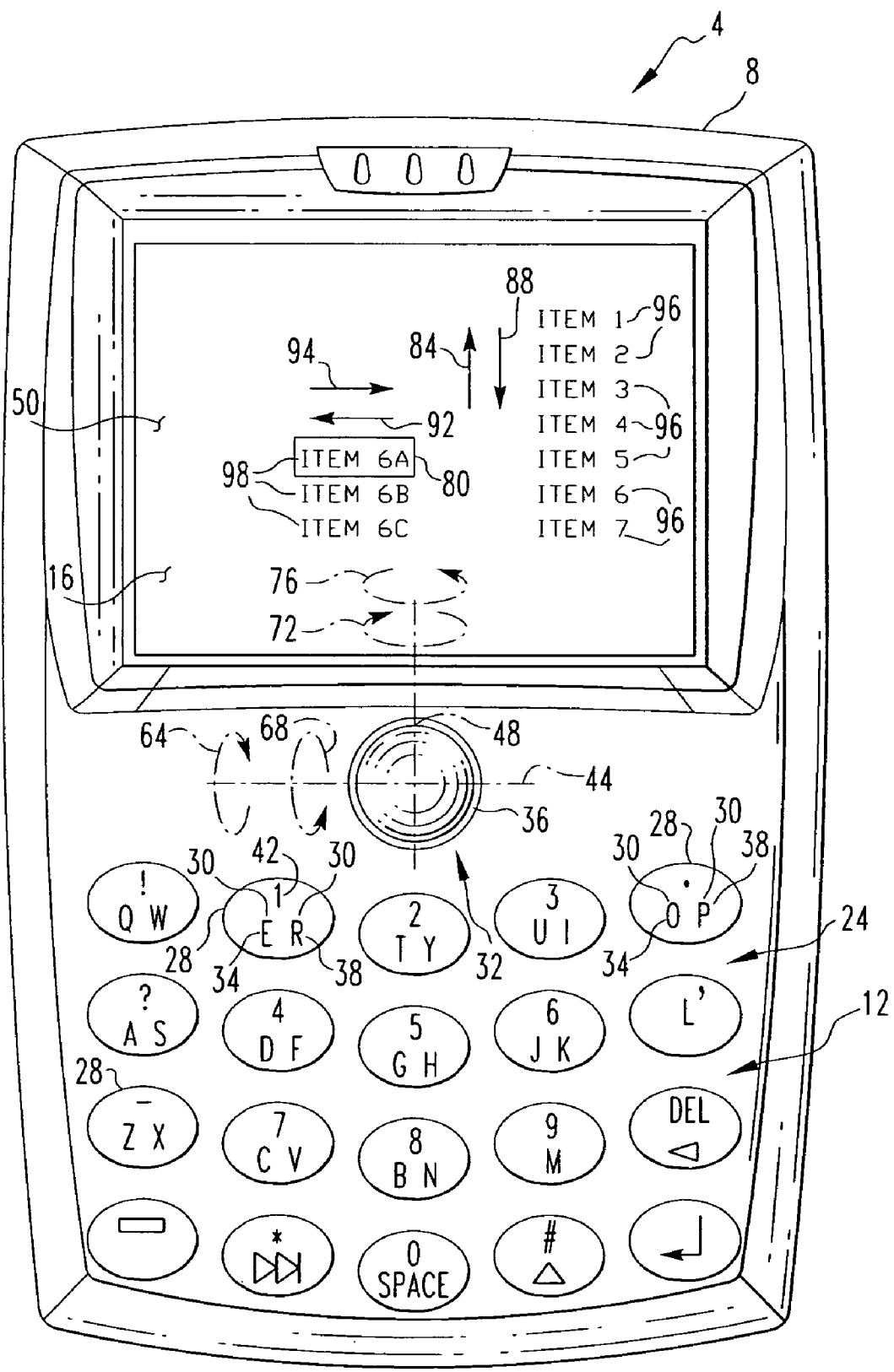
FIG. 1 is a top plan view of a handheld electronic device in accordance with a first embodiment of the invention.
Figure 2:
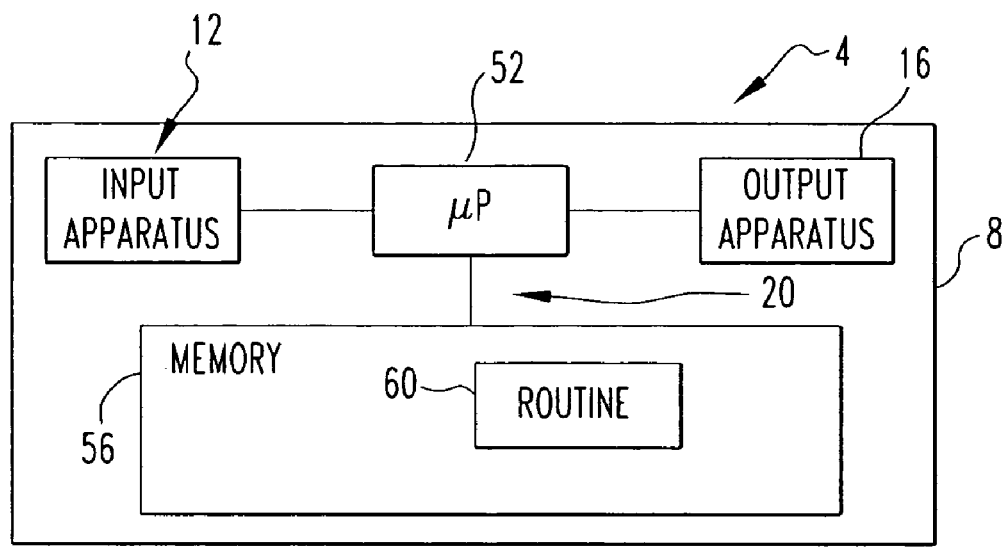
FIG. 2 is a schematic view of the handheld electronic device of FIG. 1.
Figure 3:
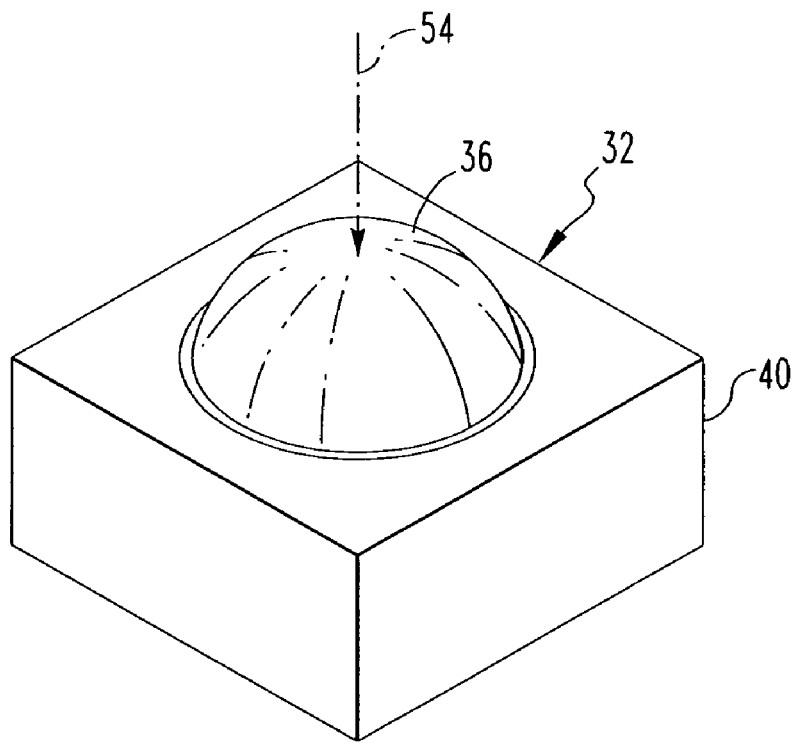
FIG. 3 is a perspective view of a component of the handheld electronic device of FIG. 1.

An improved handheld electronic device 4 in accordance with the invention is indicated generally in FIG. 1 and is depicted schematically in FIG. 2. The exemplary handheld electronic device 4 includes a housing 8 upon which are disposed an input apparatus 12, an output apparatus 16 and a processor apparatus 20. The input apparatus 12 includes a keypad 24 that can be said to include a plurality of keys 28. The input apparatus 12 further includes a roller ball input 32 that includes a movable portion 36 and a base 40 (FIG. 3).

Many of the keys 28 of the keypad 24 each include a plurality of linguistic elements 30. While the exemplary linguistic elements 30 depicted herein include Roman letters, it is understood that in other embodiments the linguistic elements could include other types of elements such as, for example, strokes and/or ideograms and/or other elements which for example, can be used individually or to create other ideograms or other elements, and can include other types of characters that are different than the Roman letters depicted herein and that can be employed in the generation of a linguistic output.

Some of the exemplary keys 28 have assigned thereto a first letter 34, a second letter 38, and a digit 42. It is noted that some of the keys 28 have only a single letter and/or include symbols such as punctuation marks for functions. The first and second letters 34 and 38 of the exemplary keypad 24 are arranged substantially in a QWERTY configuration, but other configurations are possible.

As can be understood from FIG. 1, the movable portion 36 is substantially continuously rotatable with respect to the housing 8 about a first axis 44 and about a second axis 48 to provide input. The movable portion 36 of the exemplary roller ball input 32 additionally is translatable along a translation axis 54, as can been seen in FIG. 3, to provide an additional input. The exemplary roller ball input 32 additionally provides some tactile feedback to the user such as clicks, pulses, or other indications that can be detected by the user. The roller ball input 32 can be any of a variety of devices and, for example, can be a trackball offered by ITT Industries/Cannon or other appropriate device.

While it is stated herein that the movable portion 36 is substantially continuously rotatable about the first axis 44 and the second axis 48, it is understood that the movable portion 36 likely will be rotatable about substantially any axis extending through the movable portion 36 since the movable portion 36 is substantially spherical in shape and is supported in a fashion to generally provide free rotation while being retained on the base 40. As used herein, the expression "continuously rotatable" and variations thereof shall refer broadly to an item being freely rotatable while being retained on another item.

The output apparatus 16 includes a display 50. The output apparatus 16 can additionally include, for instance, additional indicators such as lights, and the like, and can additionally include an audible output such as a speaker as well as other output devices.

The processor apparatus 20 includes a processor 52 that can be, for instance, and without limitation, a microprocessor (μP), and it is responsive to inputs from the input apparatus 12 and provides output signals to the output apparatus 16. The processor apparatus 20 further includes a memory 56 that includes a routine 60 stored therein. The exemplary routine 60 is a disambiguation routine which, responsive to a number of inputs from the keys 28, outputs a number of linguistic elements as proposed inputs. As employed herein, the expression "a number of" and variations thereof shall refer broadly to any nonzero quantity including a quantity of one. The processor 52 interfaces with the memory 56, and the routine 60 is executable on the processor 52. The quantity of proposed inputs potentially can be significant. The routine 60 also advantageously receives input from the roller ball input 32. Specifically, responsive to detecting input from the roller ball input 32 the routine provides other output to the display 50. It is understood that the memory 56 likely includes a number of other routines that are not expressly mentioned herein.

When the routine 60 is executed on the processor 52, it provides various outputs to the display 50. For instance, the display 50 may output numerous items at any one time, and the user may be required to provide an input in respect of one of the outputs on the display 50 to further interact with the routine 60.

For example, an exemplary input might be a number of actuations of a number of the keys 28, with generally each key 28 being actuated only once to signify either the first letter 34 or the second letter 38 assigned thereto. The routine 60 operates to output to the user any of a number of proposed inputs that are determined to likely have been intended by the user. Such proposed inputs can be provided to the user as outputs sent to the display 50 for selection, for instance, by the user. Such proposed inputs can be generated in any of a variety of fashions but typically would be generated based upon linguistic data and probability models stored in the memory 56, and such data may take many forms. The movable portion 36 can, for example, enable the user to easily navigate among the various choices, i.e., the proposed inputs, that are presented to the user on the display 50.

As can be seen in FIG. 1, the movable portion 36 is depicted as being rotatable in a first direction 64 and in a second direction 68 about the first axis 44, and is rotatable in a first direction 72 and in a second direction 76 about the second axis 48. In the depicted example, the first direction 64 and the second direction 68 are opposite directions of rotation, and the first direction 72 and the second direction 76 similarly are opposite directions of rotation of the movable portion 36 with respect to the housing. It is reiterated, however, that the aforementioned directions with respect to the first axis 44 and the second axis 48 are exemplary only and that the movable portion 36 likely will be continuously rotatable about many other axes to provide input.

In the exemplary embodiment depicted herein, the handheld electronic device 4 includes a user interface that, for example, allows a user to rotate the movable portion 36 in order to provide input that allows a user to navigate throughout various items that are output on the display 50 by the routine 60 or by other routines. In this regard, for example, the system focus may be represented by an indicator 80 such as a cursor. Movements of the movable portion 36 correspondingly are, for example, translated into movements of the indicator 80 on the display 50, which indicates corresponding changes of the system focus. For instance, a rotation of the movable portion 36 in the first direction 64 can, for example, move the indicator 80 in a first direction on the display 50 as is indicated by the arrow 84. In this regard, such a movement of the indicator 80 in the first direction 84 may allow the user to navigate through a series of primary output items 96 that are arranged along an axis represented by the first direction 84. A movement of the movable portion 36 in the second direction 68 may resultingly cause a movement of the indicator 80 in a second direction as is indicated by the arrow 88. Such a movement of the movable portion 36 can again be used to move the indicator 80 in a fashion that allows the user to navigate among the primary output items 96.

In a similar fashion, a rotation of the movable portion 36 in the first direction 72 may result in a movement of the indicator 80 in a first direction indicated by the arrow 92 on the display 50. A rotation of the movable portion 36 in the second direction 76 may result in movement of the indicator 80 in a second direction indicated by the arrow 94 on the display 50. Such movements of the movable portion 36 in the first and second directions 72 and 76 may allow a user to navigate the indicator 80 between one of the primary output items 96 and one of a number of secondary output items 98. Also, for example, if the system focus is on one of the depicted secondary output items 98, movement of the movable portion 36 in the first direction 64 and/or the second direction 68 can allow the user to navigate among the various secondary output items 98 that are arranged along an axis represented by the first direction 84.

The exemplary output on the display 50 of FIG. 1 may, for instance, have resulted from the following exemplary set of inputs. A number of actuations of the keys 28 may have been detected by the processor 52, and the routine 60 may have resultantly output a plurality of linguistic elements as proposed inputs that are suggested by the routine 60 as being possible interpretations of the sequence of actuations of the keys 28. The linguistic elements are depicted schematically as a plurality of primary output items 96. The default output may have been the primary output item 96 depicted schematically as "ITEM 1", with the indicator 80 being disposed above such default output. The user may have, with a single rolling motion of the movable portion 36 to provide a rotation in the second direction 68, caused the entry of a plurality of inputs, with each such input corresponding with an incremental rotational portion of the rotation of the movable portion 36 a predetermined rotational distance. As a result, for example, the indicator 80 may have been translated in the second direction 88 to be disposed above the primary output item 96 depicted schematically at "ITEM 6". The user thereafter may have, for instance, rotated the movable portion 36 in the first direction 72 which, for example, may have caused the output of the secondary output items 98. The indicator 80 may resultingly have been moved to be disposed over the secondary output item 98 depicted schematically as "ITEM 6A". If desired the user could provide another input, such as, for instance, by rotating the movable portion 36 or by translating it.

It thus can be seen that the movable portion 36 of the roller ball input 32 can be employed to provide a plurality of inputs of a variety of types by manipulating the movable portion 36 in different fashions. This is highly desirable since the routine 60 can, for example, provide a large number of outputs, and such outputs can change with every actuation of a key 28 and/or with any other input. Once a user has placed a finger, for instance, in contact with the movable portion 36, the user can pay significant attention to the outputs on the display 50 without paying much attention to the movable portion 36 while still providing numerous inputs with the movable portion. This is advantageous since the routine 60 can provide many outputs, and such outputs may require the attention of the user. By configuring the roller ball input 32 to be capable of numerous types of inputs, all of which can be made almost intuitively by the user once the user has placed a finger on the movable portion 36, inputs into the device 4 via the roller ball input 32 require minimal attention by the user. By reducing the attention required in providing inputs, and by allowing the user to pay relatively more attention to the outputs on the display 50, the overall amount of attention needed from the user to interact with the routine 60 is less than would otherwise be the case with other input structures that require, for instance, repositioning of the user's finger to other locations to provide different inputs or, for instance, that require a user to make multiple discrete movements of the finger to provide multiple inputs.

As has been suggested above, the movable portion 36 can also be translated along the translation axis 54 to cause the roller ball input 32 to provide another input such as, for example, a selection input or other input. The movable portion 36 may, for instance, be biased to a first position, with a translation of the movable portion 36 along the translation axis 54 overcoming the bias and allowing the roller ball input 32 to provide the aforementioned input, although numerous other configurations are possible.

It is understood that the exemplary primary output items 96 and secondary output items 98 are intended to depict an exemplary aspect of a user interface including the routine 60 with which a user can interact by rolling the movable portion 36 to provide inputs, such as is reflected by movement of the indicator 80 on the display 50. As has been suggested above, the movable portion 36, being substantially continuously rotatable with respect to the housing 8 about multiple axes to provide input, as well as being translatable to provide input, enables the roller ball input 32 to provide numerous and varied inputs for use in interacting with numerous types of routines being executed on the processor 52. By directly tying together a rotation of the movable portion 36 with a result on the display 50, for instance, once the user has placed a finger on the movable portion 36, the user can manipulate the movable portion 36 to provide input substantially without further need of the user to look at the movable portion 36. That is, the substantially continuously rotatable movable portion 36 can be manipulated by a user in a intuitive fashion to provide input since, in the present example, an association is made in the mind of the user between a particular movement of the movable portion 36 and a corresponding result on the display 50, such as the movement of the indicator 80 in a particular direction. This advantageously facilitates inputs by the user by reducing the amount of attention required of the user in providing the input. It is noted that the numerous different types of manipulations of which the movable portion 36 is capable correspondingly allow the user to provide numerous types of input on an intuitive basis.

A rotation of the movable portion 36 a predetermined rotational distance will result in the roller ball input 32 providing an input to the processor apparatus 20. Each successively further rotation of the movable portion 36 the predetermined rotational distance will successively provide corresponding inputs to the processor apparatus 20, which enables, for instance, a plurality of inputs to be provided in a single rolling or rotating motion of the movable portion 36. That is, a single rotational movement can be made up of a plurality of incremental rotations, with each of the incremental rotations being an input. The ability of the roller ball input 32 to provide a plurality of inputs from a single extended rolling motion of the movable portion 36, for instance, provides multiple inputs without requiring the same degree of user attention as is required for inputs with such other devices. This is particularly useful in conjunction with the routine 60 which is a disambiguation routine. Moreover, a user can provide inputs from rotation of the movable portion 36 about the first axis 44 as well as inputs from rotation of the movable portion 36 around the second axis 48, again with minimal attention being required to provide the two inputs which, in the present example, are different inputs. By reducing the amount of attention, both visual and mental, required by the user in providing input, the resulting handheld electronic device 4 is easier to use and therefore is more useful to a user.

Figure 4:
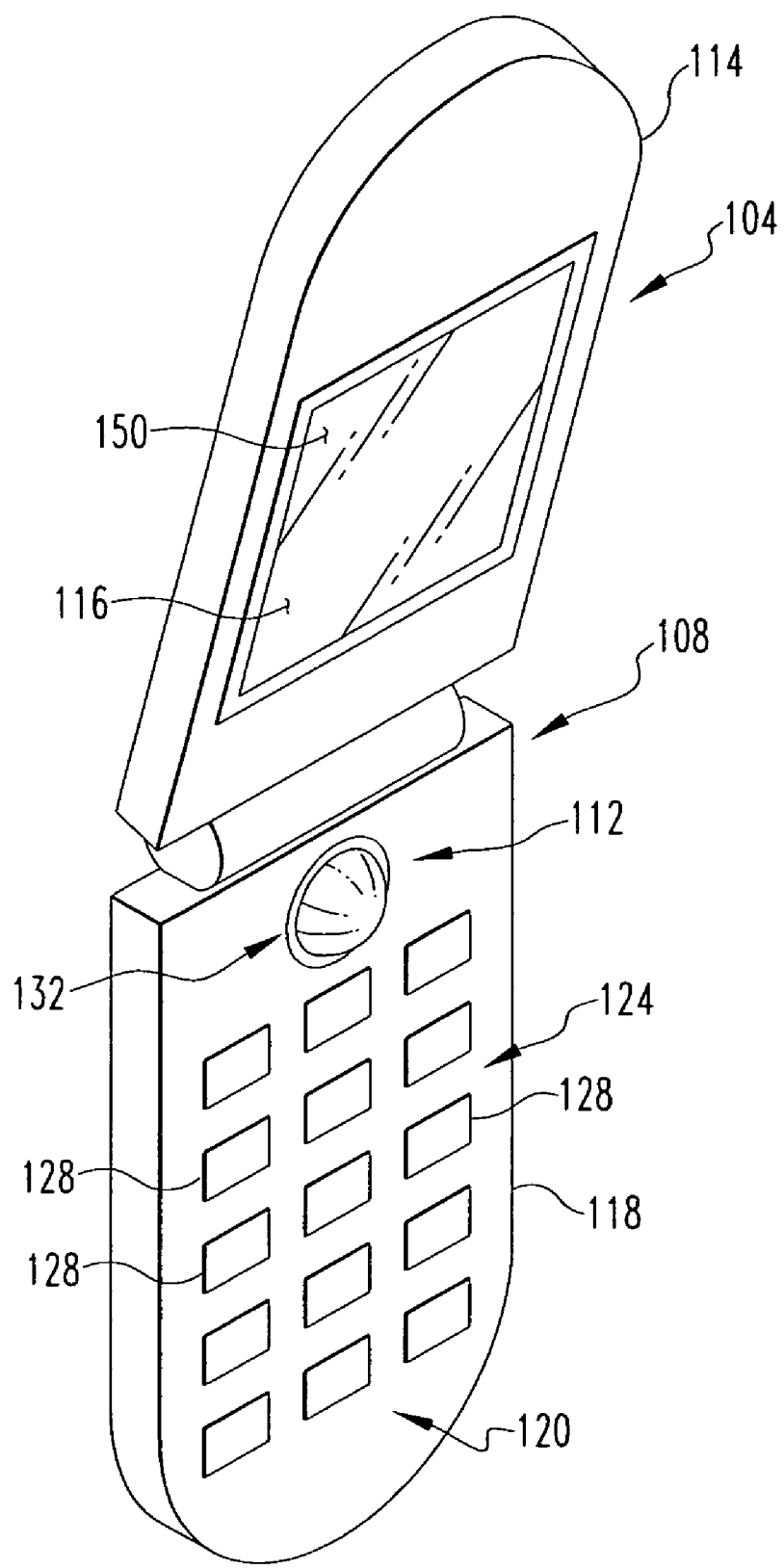
FIG. 4 is a perspective view of a handheld electronic device in accordance with a second embodiment of the invention.

An improved handheld electronic device 104 in accordance with a second embodiment of the invention is depicted generally in FIG. 4. The handheld electronic device 104 includes a housing 108 having a first portion 114 and a second portion 118 that are movably connected together. The handheld electronic device 104 additionally includes a processor apparatus 120 and an input apparatus 112 having a keypad 124 that includes plurality of keys 128. The input apparatus 112 further includes a roller ball input 132 that is substantially the same as the roller ball input 32. In the depicted exemplary embodiment, a display 150 of an output apparatus 116 of the handheld electronic device 104 is disposed on the first portion 114, and the roller ball input 132 is disposed on the second portion 118.

It is understood that in the exemplary handheld electronic device 104 at least some of the keys 128 each have a plurality of linguistic elements assigned thereto, but such linguistic elements are not depicted in FIG. 4 for purposes of clarity. The processor apparatus 120 includes at least a first routine which may be, for instance, an input routine such as a disambiguation routine. By providing the roller ball input 132 on the handheld electronic device 104, benefits can be achieved on the handheld electronic device 104 such as those achieved in implementing the roller ball input 32 on the handheld electronic device 4, as well as other benefits. That is, various inputs can be easily made using the roller ball input 132 and, for example, such various inputs can advantageously be used in interfacing with the routine. The roller ball input 132 allows substantially continuous rotation of a movable portion thereof about a plurality of axes to provide input, and thus enables the roller ball input 132 to generate various types of inputs. If the routine is a type that accepts or requires various types of inputs, the roller ball input 132 can be advantageously employed to provide such inputs while requiring minimal user attention.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A handheld electronic device comprising:
    a processor apparatus comprising a processor and a memory;
    an input apparatus cooperable with the processor apparatus;
    an output apparatus cooperable with the processor apparatus, the output apparatus including a display; and
    a housing;
    the processor apparatus being adapted to receive input from the input apparatus and to provide output to the display;
    the input apparatus including a plurality of first input members and a second input member, each first input member of at least a portion of the plurality of first input members having a plurality of linguistic elements assigned thereto, substantially each first input member of the at least a portion of the plurality of first input members being adapted to generate a first input upon being actuated;
    the second input member including a movable portion that is substantially continuously rotatable with respect to the housing about at least first axis and a second axis to provide input and, responsive to a rotation of the movable portion about at least one of the first axis and the second axis, the second input member being adapted to generate a number of second inputs, the rotation including a number of incremental rotations of the movable member a predetermined rotational distance, with substantially each incremental rotation corresponding with a second input of the number of second inputs; and
    the memory having stored therein a routine that is executable on the processor, responsive to a detection of a number of first inputs, the routine being adapted to output to the display a number of proposed linguistic elements and, responsive to a detection of successive second inputs, the routine being adapted to move an indicator, the indicator arranged to navigate throughout the proposed linguistic elements on to the display.

2. The handheld electronic device of claim 1, wherein the movable portion is translatable with respect to the housing to provide input.

3. The handheld electronic device of claim 1, wherein the movable portion is substantially spherical.

4. The handheld electronic device of claim 1, wherein, responsive to a rotation of the movable portion a predetermined rotational distance in a first direction about the first axis, the second input member is adapted to provide a second input and, responsive to substantially each further rotation of the movable portion in the first direction a predetermined rotational distance beyond a prior rotation of the movable portion a predetermined rotational distance in the first direction, the second input member is adapted to provide a second input.

5. The handheld electronic device of claim 4, wherein, responsive to a rotation of the movable portion a predetermined rotational distance, the movable portion provides a tactile feedback to a user.

6. The handheld electronic device of claim 1, wherein the housing includes a first portion and a second portion movably connected together.

7. The handheld electronic device of claim 6, wherein one of the display and the second input member is disposed on the first portion, and wherein the other of the display and the second input member is disposed on the second portion.

8. The handheld electronic device of claim 1, wherein the linguistic elements assigned to the first input members are arranged in a substantially QWERTY configuration.

9. A method of enabling input into a handheld electronic device, the handheld electronic device including a housing, a processor apparatus, an input apparatus, and an output apparatus, the input apparatus including a plurality of first input members and a second input member, each first input member of at least a portion of the plurality of first input members having a plurality of linguistic elements assigned thereto, the second input member being substantially continuously rotatable with respect to the housing about a first axis and a second axis to provide input, the processor apparatus including a processor and a memory, the memory including a routine stored therein, the method comprising:
    detecting as inputs a number of actuations of a number of first input members of the plurality of first input members;
    responsive to the number of actuations of the number of first input members, outputting from the routine to the display at least a first output including a number of proposed linguistic inputs;
    detecting a plurality of first inputs from a first rotation of the second input member about the first axis, the first rotation comprising a plurality of incremental rotations of the second input member a predetermined rotational distance about the first axis, substantially each incremental rotation of the plurality of incremental rotations corresponding with a first input of the plurality of first inputs; and
    responsive to said detecting a plurality of first inputs, outputting from the routine to the display a second output.

10. The method of claim 9, further comprising detecting a second input from a second rotation of the second input member about the second axis, and responsive to said detecting a second input, providing another output to the display.

11. The method of claim 9, further comprising detecting as the first rotation a single rotational movement including the plurality of incremental rotations of the second input member about the first axis.

12. The method of claim 9, further comprising outputting as at least a portion of the output a plurality of proposed linguistic inputs generated by the disambiguation routine.

13. A method of enabling input into a handheld electronic device, the handheld electronic device including a housing, a processor apparatus, an input apparatus, and an output apparatus, the input apparatus including a plurality of first input members and a second input member, each first input member of at least a portion of the plurality of first input members having a plurality of linguistic elements assigned thereto, the second input member being substantially continuously rotatable with respect to the housing about a first axis and a second axis to provide input, the processor apparatus including a processor and a memory, the memory including a routine stored therein, the method comprising:

detecting a number of first inputs to the routine from a number of actuations of a number of first input members of the plurality of first input members and providing a plurality of first outputs therefrom;

detecting a plurality of second inputs to the routine, from a rotation of the second input member, the rotation comprising a plurality of incremental rotations of the second input member a predetermined rotational distance, substantially each incremental rotation of the plurality of incremental rotations corresponding with a second input of the plurality of second inputs;

responsive to said detecting a number of first inputs, outputting to the display first output including a number of proposed linguistic inputs; and responsive to said detecting a plurality of second inputs, providing a second output to the display.

14. The handheld electronic device of claim 1, wherein the plurality of first input members comprise a reduced keyboard and the second input member is a roller ball.

\* \* \* \* \*